(12) United States Patent
Collins et al.

(10) Patent No.: US 6,390,086 B1
(45) Date of Patent: May 21, 2002

(54) MOBILE CONCRETE SAW

(76) Inventors: Louis M. Collins, 325 Long Bow Rd., Knoxville, TN (US) 37922; Rick Jenkins, 631 Island Ford Rd., Lake City, TN (US) 37769

(*) Notice: Subject to any disclaimer, the term of this patent is extended or adjusted under 35 U.S.C. 154(b) by 82 days.

(21) Appl. No.: 09/648,199

(22) Filed: Aug. 25, 2000

(51) Int. Cl.[7] .................................................. B28D 1/04
(52) U.S. Cl. ............................... 125/13.01; 125/13.03; 299/39.3
(58) Field of Search .................... 125/13.01, 13.03, 125/12, 14, 15, 18; 299/39.3, 39.4, 39.6, 39.9

(56) References Cited

U.S. PATENT DOCUMENTS

| | | |
|---|---|---|
| 2,673,725 A | 3/1954 | Coates |
| 2,700,256 A | 1/1955 | Lewis |
| 2,709,878 A | 6/1955 | Olson |
| 3,261,383 A | 7/1966 | Coblentz |
| 3,357,745 A | 12/1967 | Cooper |
| 3,608,969 A * | 9/1971 | Fowkes .................... 299/1.5 |
| 3,663,060 A | 5/1972 | Shatwell et al. |
| 4,131,103 A | 12/1978 | Ishizuka |
| 4,188,934 A | 2/1980 | Reinhardt et al. |
| 4,236,356 A | 12/1980 | Ward |
| 4,463,989 A * | 8/1984 | Kennedy .................. 299/39.4 |
| 4,840,431 A | 6/1989 | Jedick |
| 4,900,094 A * | 2/1990 | Sergeant .................. 299/39.6 |
| 5,579,754 A * | 12/1996 | Chiuminatta et al. .... 125/13.01 |
| 5,709,200 A * | 1/1998 | Mertes .................... 125/13.01 |
| 5,809,985 A * | 9/1998 | Kingsley et al. ......... 125/13.01 |
| 5,908,224 A * | 6/1999 | Santos ....................... 299/39.2 |
| 6,019,433 A | 2/2000 | Allen |
| 6,073,621 A | 6/2000 | Cetrangolo |

* cited by examiner

Primary Examiner—Joseph J. Hail, III
Assistant Examiner—David B. Thomas
(74) Attorney, Agent, or Firm—Pits & Brittian, P.C.

(57) ABSTRACT

A cured-concrete-cutting saw which is sufficiently mobile as facilitates its transport to a work site located within a building, and between work sites within a building, for example, and which is useful in cutting block-out grooves for expansion joints between adjacent sides of adjacent concrete slabs and/or troughs in the surface of such slabs. The saw includes a housing, a blade assembly comprising a plurality of circular blades disposed in spaced apart parallel relationship to one another on the outboard end of a driven shaft that is mounted on the bottom of the housing. A motor provides power for rotation of the shaft and its blade assembly. Optionally, the motor provides power for propelling the saw over the top surface of a concrete slab. A mechanism is provided for operator adjustment of the depth of cut of the blades of the blade assembly from a position adjacent the aft end of the saw. Through the means of selecting different diameter blades for the blade assembly, the saw may be employed to cut a variety of block-outs or troughs of different cross-sectional geometries, in the top surface of a concrete slab. A method is disclosed for the formation of an elongated block-out or trough in the top surface of a cured concrete slab for the preparation of adjacent side margins of adjacent sides of adjacent concrete slabs and for the installation of an expansion strip in the space between these adjacent sides.

25 Claims, 6 Drawing Sheets

MOBILE CONCRETE SAW

FIELD OF INVENTION

This invention relates to saws for cutting grooves or the like in the surface of concrete slabs, particularly cured concrete slabs, such as in the top surface of the concrete floor of a building or the like.

BACKGROUND OF INVENTION

Concrete floors, commercial-sized vehicle garage floor surfaces, for example, and the like are commonly poured in slabs, a slab being a substantially planar expanse of concrete of a given thickness, commonly less than eight inches, whose side dimensions are commonly defined through the use of rigid forms that are removed after the concrete has cured sufficiently. In certain concrete slab pouring operations, the concrete is sufficiently self-supporting as poured so that a "moving" form may be employed, thereby speeding up the overall process.

Expansion joints are commonly deployed between adjacent sides of adjacent slabs to accommodate expansion of the concrete in response to climatic conditions and other external influences. These expansion joints are not to be confused with the stress-relieving relatively narrow slits which are cut in uncured concrete employing a single-bladed implement, and which are materially less demanding of the implement than the demands placed on implements employing in cutting cured concrete.

Expansion joints between the adjacent sides of adjacent slabs of concrete, on the other hand, are robust and commonly require the insertion of a resilient strip of polymeric material into the space between the adjacent sides of the slabs. In a common form, the compressible strip takes the form of a generally T-shaped cross-section strip in which the leg of the "T" resides within a space between the adjacent sides of the slabs and each of the side wings of the "T" lays in a groove of generally rectangular cross-section that is cut along the respective side margin of each of the adjacent slabs. Such groves are referred to as "block-outs". The wings are thereafter anchored in place employing a polymeric material that bonds the wings in their respective grooves. Proper installation and functioning of such expansion joints requires that the groove along the side of a slab be of a precise depth, commonly ¾ inch. To accommodate a wing of the expansion joint, each groove commonly must be between about 4 and about 8 inches in width.

When employing either rigid forms or a "moving" form in the pouring of a concrete slab, it is impractical, or even impossible to form the required groove along the side edges of a slab for receipt of the wings of the expansion joint. Thus, the grooves must be cut into the slab after the concrete has cured.

Heretofore, it has been common practice to employ a single-bladed self-propelled concrete saw or a multi-bladed hand-held saw for cutting the aforesaid side margin grooves in cured concrete slabs. The blades of these saws are limited to cutting a kerf which is relatively small in width, usually between about ⅛ and about ⅜ inch in width, due to the cost of manufacture of wider blades. Thus, it is common practice in the art to perform a plurality of parallel spaced-apart cuts along the desired length of the groove, employing a single circular rotating blade, such cuts being spaced apart by about one inch, and thereafter breaking away the uncut concrete between the parallel cuts, as by means of a hammer, or other like instrument or device. Use of a single bladed saw for cutting wide grooves is inordinately time-consuming in that multiple passes of the saw blade along the length of the groove must be employed to achieve the desired width of the groove. Moreover maintaining parallelism of the several cuts requires some form of guidance of the saw with reference to the side edge of the slab, for example. Known multi-bladed concrete saws are limited to hand-held devices which are restricted in their maximum depth of cut, speed of cutting, and overall efficiency. These devices are suitable for cutting grooves of limited length, such as grooves in stair steps and the like. However, due to their relative fragile construction, which is required to permit them to be hand-held, these devices are not suitable for cutting grooves of extended length such as in concrete slabs or the like. All known self-propelled concrete saws, aside from the massive highway surface groove-cutting machines which are unsuitable in size and mobility for use in cutting block-outs or troughs in concrete slabs, employ only a single blade.

It is therefore an object of the present invention to provide a mobile cured-concrete-cutting saw suitable for performing block-outs and troughs in the top surface of a concrete slab.

It is another object of the present invention to provide a mobile cured-concrete-cutting saw which is portable for ready transport to and from work sites within buildings.

It is another object of the present invention to provide a self-propelled cured-concrete-cutting saw equipped with a plurality of circular cutting blades mounted for simultaneous operation thereof.

It is another object of the present invention to provide a cured-concrete-cutting saw having a blade assembly including a plurality of cutting blades and wherein the blade assembly is selectively adjustable to different cutting depths.

It is another object of the present invention to provide a cured-concrete-cutting saw which is suitable for the cutting of a block-out or trough of non-rectangular cross-section in a concrete slab.

Other objects and advantages of the present invention will be recognized from the description contained herein, including the claims and the drawings.

SUMMARY OF INVENTION

In accordance with one aspect of the present invention there is provided a cured-concrete-cutting saw which is sufficiently mobile as facilitates its transport to a work site located within a building, for example, and which is useful in cutting block-out grooves for expansion joints between adjacent sides of adjacent concrete slabs and/or troughs in the surface of such slabs. The saw includes a housing, a blade assembly comprising a plurality of circular blades disposed in spaced apart parallel relation to one another on the outboard end of a shaft that is mounted on the bottom of the housing. A motor provides power for rotation of the shaft and its blade assembly and, optionally, power for propelling the saw over the top surface of a concrete slab. A mechanism is provided at a position adjacent the aft end of the saw for operator adjustment of the depth of cut of the blades of the blade assembly. Through the means of selecting different diameter blades for the make-up of a blade assembly, the saw may be employed to cut block-outs or troughs of different cross-sectional geometries, in the top surface of a concrete slab.

DETAILED DESCRIPTION OF INVENTION

As used herein, a "mobile" saw refers to a saw which is of a size and design which causes the saw to be readily transported between work sets, manipulated, normally by an operator walking behind the saw, between work locations at a work site including passage through door openings of less then about 40 inches in opening width, and in the course of cutting kerfs in the top surface of a cured concrete slab.

Figure 1:
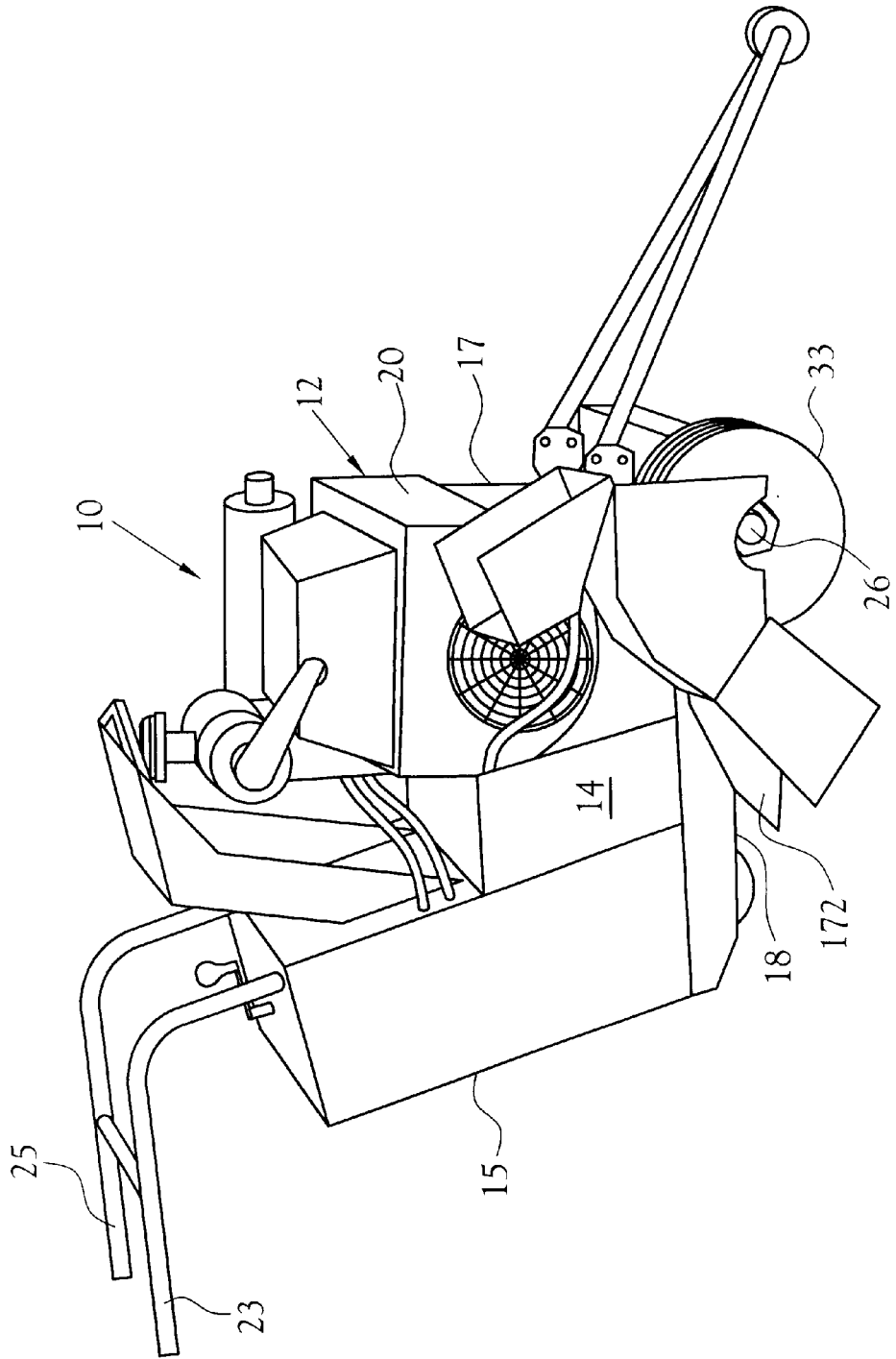
FIG. 1 is a perspective view of a concrete-cutting saw embodying various of the features of the present invention.
Figure 2:
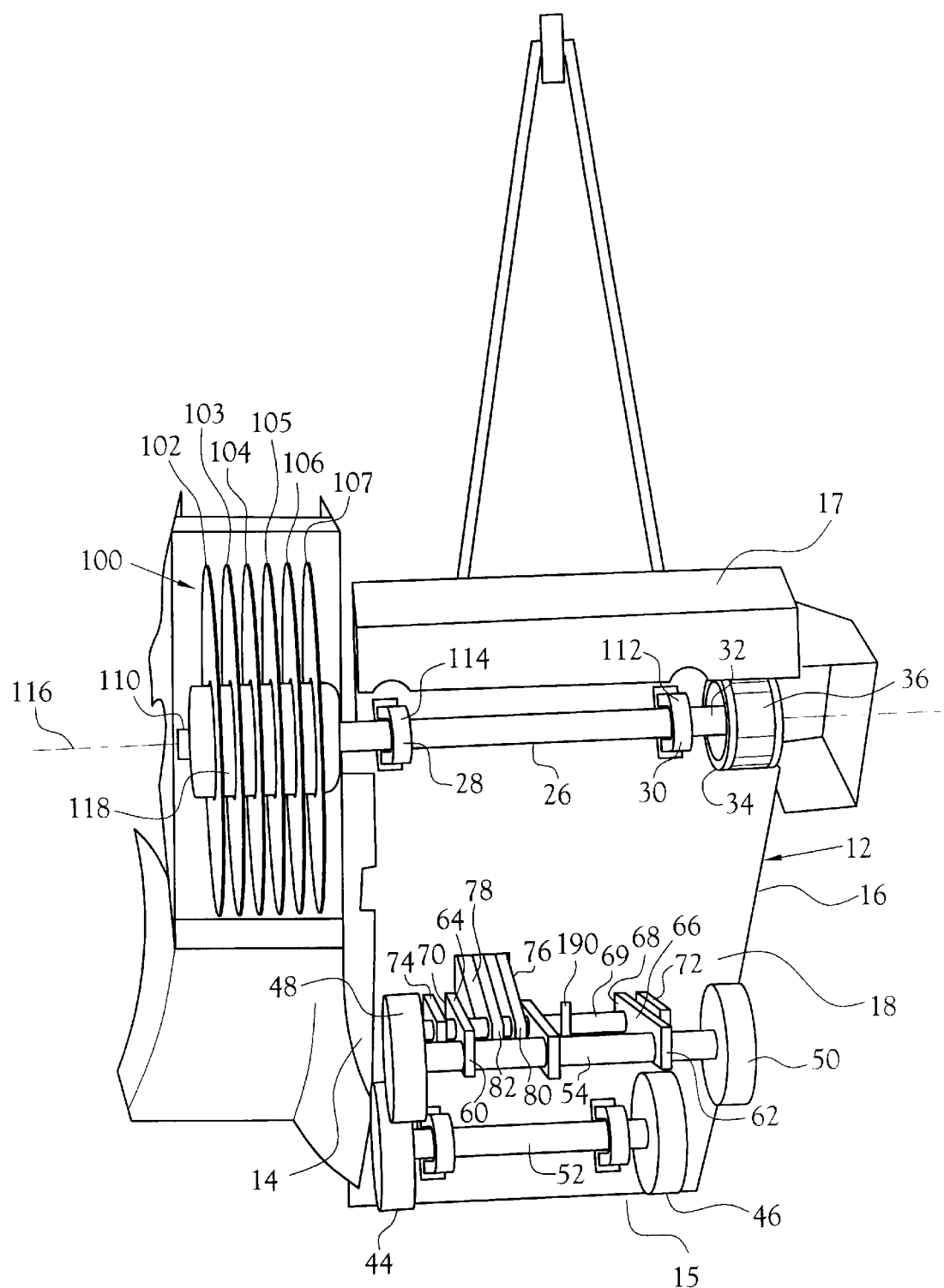
FIG. 2 is a perspective view of the bottom of the saw depicted in FIG. 1.

Referring to the several Figures, and initially FIGS. 1 and 2, one embodiment of a mobile saw 10 including various of the features of the present invention includes a multi-compartmental housing indicated generally at 12 having opposite sides 14,16 aft and front ends 15,17, respectively and a bottom 18. A portable engine 20, such as a gas-powered small implement engine of about five horsepower, is mounted to the housing and includes an output shaft, having a pulley mounted thereon. A driven shaft 26 is journalled 28,30 on the bottom of the housing adjacent the forward end 17 of the housing and includes a first end 32 having a pulley 34 secured thereon. Driving interconnection between the motor shaft pulley and the pulley 34 mounted on the first end of the drive shaft 26 is provided by a belt 36 or other suitable flexible element. As desired, the output shaft of the motor may be mechanically connected in driving connection with the drive shaft 26 by appropriate gears or the like. Operator handholders 23,25 are provided adjacent the aft end of the saw.

Referring specifically to FIG. 2, the housing 12 of the present saw is provided with first and second sets of wheels, 44,46 and 48,50, respectively, each set of wheels being rotatably mounted on respective axles 52,54, which, in turn, are mounted on the bottom of the housing. In the depicted embodiment, the first set of wheels 44,46 are freely rotatable on their axle 52, with the axle 52 being fixedly mounted to the bottom of the housing in position to cause the first set of wheels to support the aft end 15 of the housing above the top surface 56 of a concrete slab 58 (See FIG. 8 and 9). Notably this first set of wheels 44,46 is located adjacent the aft end of the saw and are fixed with respect to their vertical relationship to the housing, i.e., they and not adjustable vertically. (See FIGS. 8 and 9, also)

The axle 54 associated with the second set of wheels 48,50 is non-rotatably mounted on the outboard ends 60,62 of first and second elongated support members 64,66 which, in turn, have their inboard ends 68,70 non-rotatably mounted on an axle 69 which, in turn is rotatably mounted to the bottom 18 as by brackets 72,74 that project from the bottom of the housing. The axle 54 is further provided with a set of elongated lever arms 76,78, the outboard ends 80,82 of which are fixedly secured to the axle 69 and extend from the axle 69 to receive on their outboard ends a lead nut 88 (See FIG. 8 and 9). A lead screw 90 rotatably mounted in the housing 12 at a location adjacent the aft end 15 of the saw and extending generally vertically downwardly from its mounting in the housing, is threadably received within the lead nut. Its opposite end 89 is fitted with a handle 92 by means of which the screw 90 may be rotated by the operator. It will be recognized that rotation of the lead screw 90, the vertical level of the lead nut 88 on the screw is changed. This generally vertical movement of the lead nut 88 produces pivotal movement of the lever arms 76,78 and resultant rotational movement of the axle 69 which, in turn, positions the axle and its wheels 48,50 nearer to or further from the bottom 18 of the housing, hence raises or lowers the forward end 17 of the housing relative to the top surface 56 of the concrete slab 58.

Figure 8:
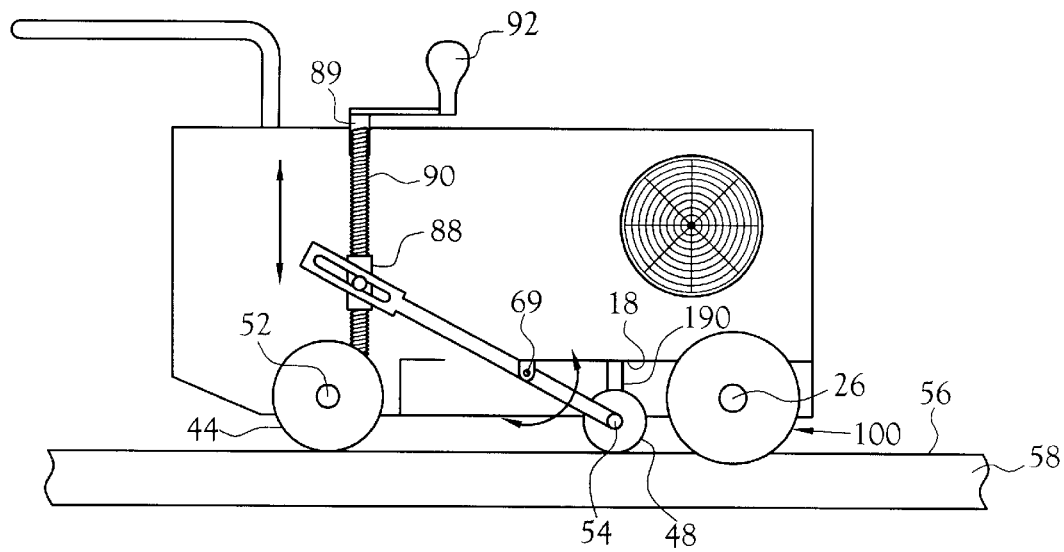
FIG. 8 is a schematic representation of one embodiment of a mechanism for adjusting the depth of cut of the blades of a saw of the type depicted in FIG. 1.
Figure 9:
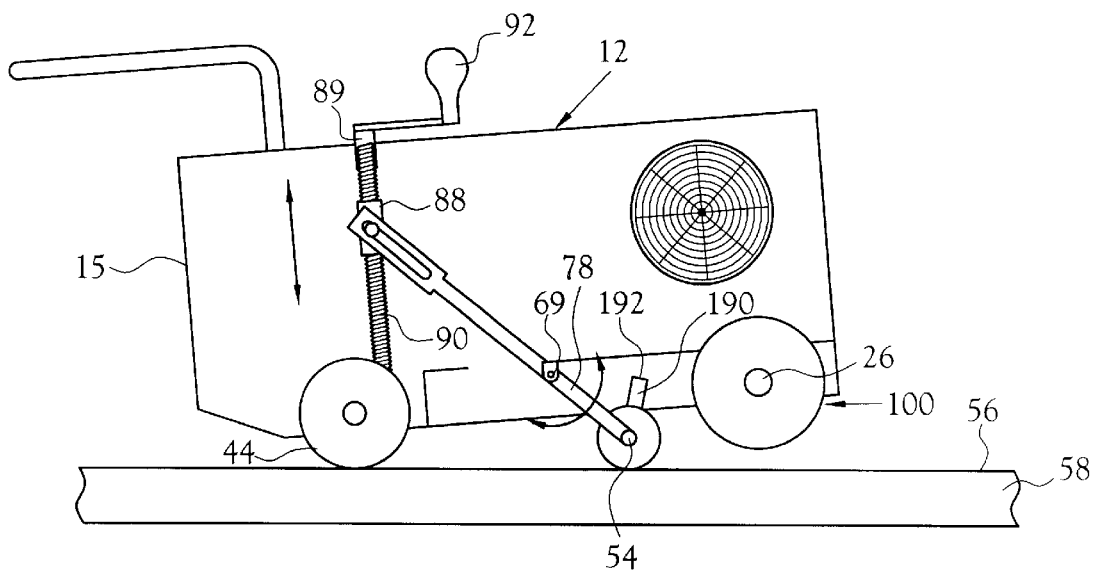
FIG. 9 is a side elevational representation of the mechanism depicted in FIG. 6; and, FIG. 10 depicts a typical expansion strip installation between adjacent sides of adjacent concrete slabs.

An assembly 100 of individual circular concrete-cutting blades 102–107 are mounted on the outboard end 110 of the drive shaft 26 which is journalled as at 112,114 to the bottom of the housing adjacent the forward end 17 of the housing. Thus, as seen in FIGS. 8 and 9, when the positional relationship of the forward end of the housing and the top surface of the concrete slab is adjusted, the positional relationship of the blade assembly to the concrete slab is likewise adjusted, thereby adjusting the permissible cutting depth of the blades into the concrete slab. It will be recognized that lowering the housing toward the top surface of the concrete slab positions the blades for greater cutting penetration into the slab and raising the housing away from the top surface of the concrete slab reduces the permissible cutting depth of the blades. The weight of the motor, housing and ancillary components of, the present saw, which are by design located adjacent the forward end 17 of the saw, bias the blades toward their cutting positions relative to the concrete slab.

Importantly in the present invention the second set of wheels 48,50 are mounted to the bottom of the housing at a location which is intermediate the aft location of the first set of wheels 44,46 and the forward location of the mounting of the driven shaft 26. As depicted in FIGS. 8 and 9, this relative mounting of these components of the saw and the action effected through the lead screw and the components associated therewith, effectively rotates the housing about the axle 52 and raises or lowers the front end 17 of the housing relative to the top surface of a concrete slab, resulting in the desired engagement or disengagement of the blades of a blade assembly 100 which is mounted forward of the mounting location of the axle 69 and forward of the position of the wheels.

The blade assembly 100 of the present invention includes a plurality, e.g. 2 to 10, circular concrete-cutting blades 102–107 which are secured on the outboard end 110 of the driven shaft 26. The blades are arranged in side-by-side relationship to one another and are oriented substantially parallel to one another and in respective planes which are substantially normal to the longitudinal rotational axis 116 of the drive shaft 26. Ring spacers 118 (typical) are fitted onto the drive shaft 26 between adjacent ones of the blades, the thickness of the spacers determining the extent of spatial separation between adjacent blades. Notably, the blade assembly and its plurality of blades are disposed outboard of the housing of the saw in cantilevered fashion. This structural feature permits rigid mounting of the shaft close to the bottom of the housing while employing blades which are of a diameter that is greater than twice the separation distance between the rotational axis of the driven shaft 26 and the bottom surface of the housing bottom. Moreover, this blade mounting feature permits the employment of a plurality of blades, the number of permissible blades being only a function of the stiffness and rigidity of the shaft 26. Still further, cantilevered mounting of the blades laterally of the housing provides for ready directing of debris away from the uncut portion of the top surface of the concrete slab such that forward or lateral-guiding movements of the saw are not impeded.

Figure 3:
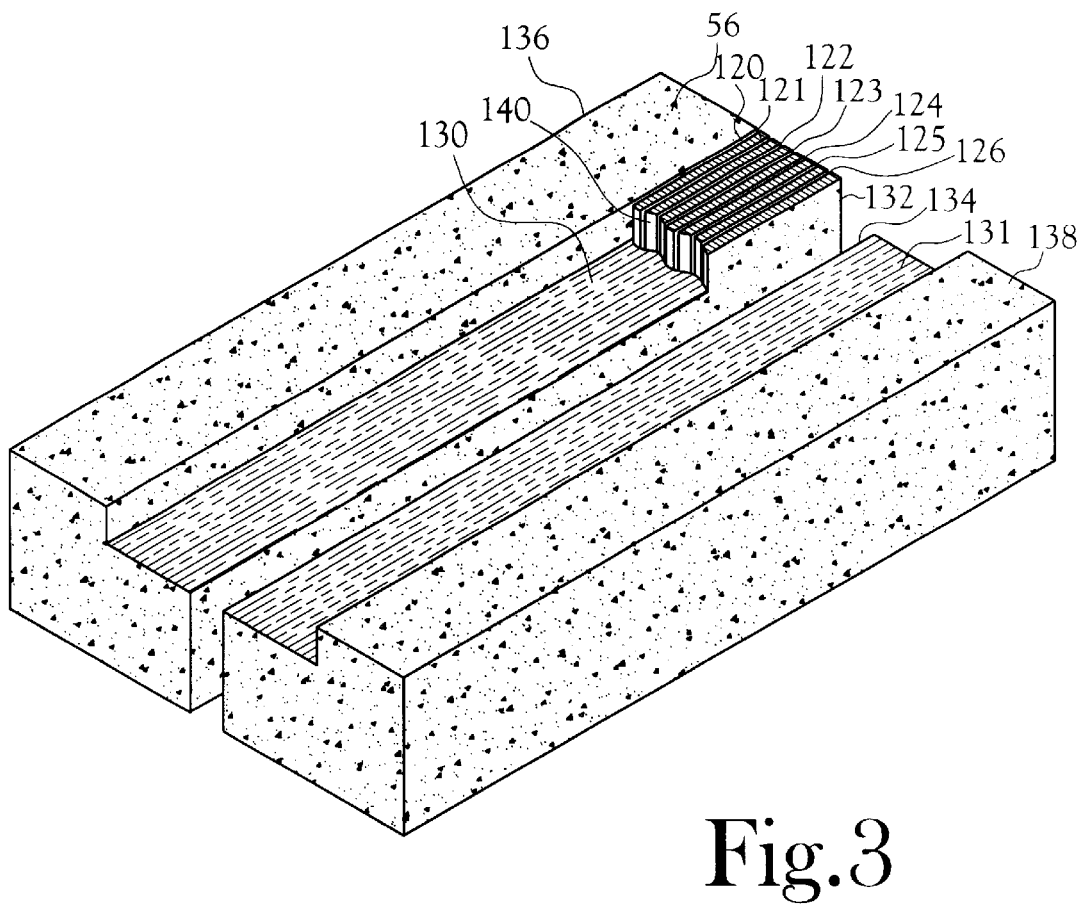
FIG. 3 is a representation of a block-out groove which has been initially cut employing the saw depicted in FIG. 1.
Figure 10:
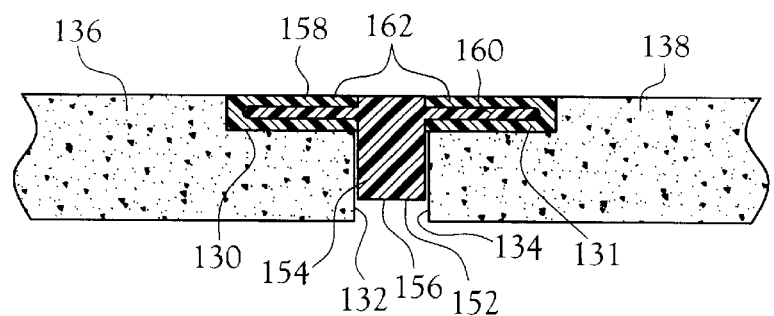

In the embodiment depicted in FIG. 2, the blades are all of like diameter hence all these blades engage the concrete slab at the same time and to the same extent. This embodiment of the blade assembly provides for the simultaneous cutting of a plurality of parallel kerfs 120–126 which are spaced apart by substantially the same distance as the spatial separation of the individual blades of the blade assembly. When cutting a block-out 130 (see FIGS. 3 and 10), as for installation of expansion joints between adjacent side edges 132,134 of adjacent concrete slabs 136,138 as depicted in FIGS. 3 and 10, the spatial separation of the blades is chosen to permit ready break-away of the uncut ridges 140 (typical) concrete disposed between the kerfs. In a typical block-out, these uncut ridges of concrete must each be of a thickness of about ⅜ inch and are readily broken away using a hammer or other implement as is known in the art. Greater thickness of the uncut thicknesses may produce a block-out having a rougher bottom surface as opposed to the bottom surface of a block-out formed from thinner uncut ridges.

Figure 4:
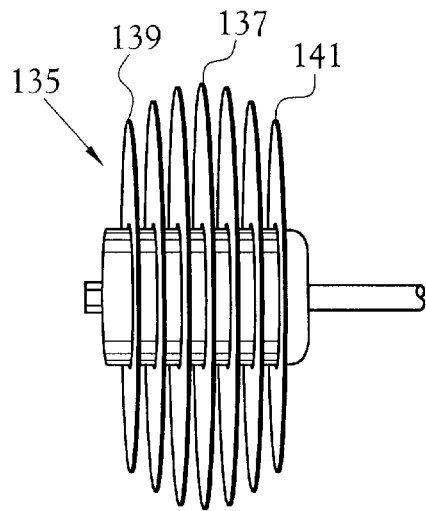
FIG. 4 is a representation depicting a frontal plane view of a saw assembly of the type depicted in FIG. 1, having an assembly of blades which incrementally decrease in diameter from a central blade of maximum diameter to laterally outward blades of minimum diameter.
Figure 5:
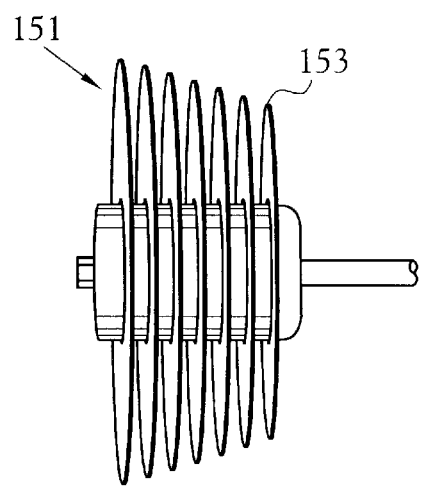
FIG. 5 is a representation of a saw of the type depicted in FIG. 1, but employing an assembly of blades which incrementally decrease in diameter from an outboard blade of a maximum diameter to an inboard blade of minimum diameter.
Figure 6:
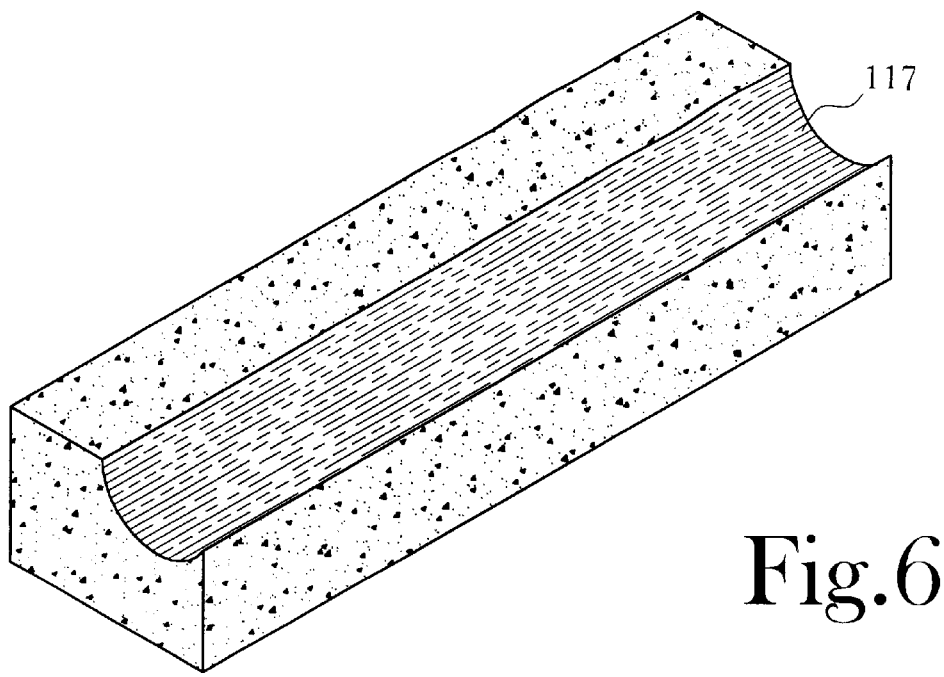
FIG. 6 is a representation of a trough of generally semi-circular cross-section and which has been initially cut employing the blade assembly depicted in FIG. 4.

Referring to FIGS. 4 and 5, further embodiments of the blade assembly of the present invention are designed to cut block-outs or troughs of non-rectangular cross-sections. In FIG. 6 there is depicted a trough 117 having a generally semi-circular cross-section. This trough is cut using the present invention and a blade assembly 135 (See FIG. 4) in which the plurality of blades incrementally decrease in diameter from a maximum diameter of the most central 137 of the blades of the assembly to a minimum diameter blades 139,141 at each of the opposites sides of the blade assembly.

Figure 7:
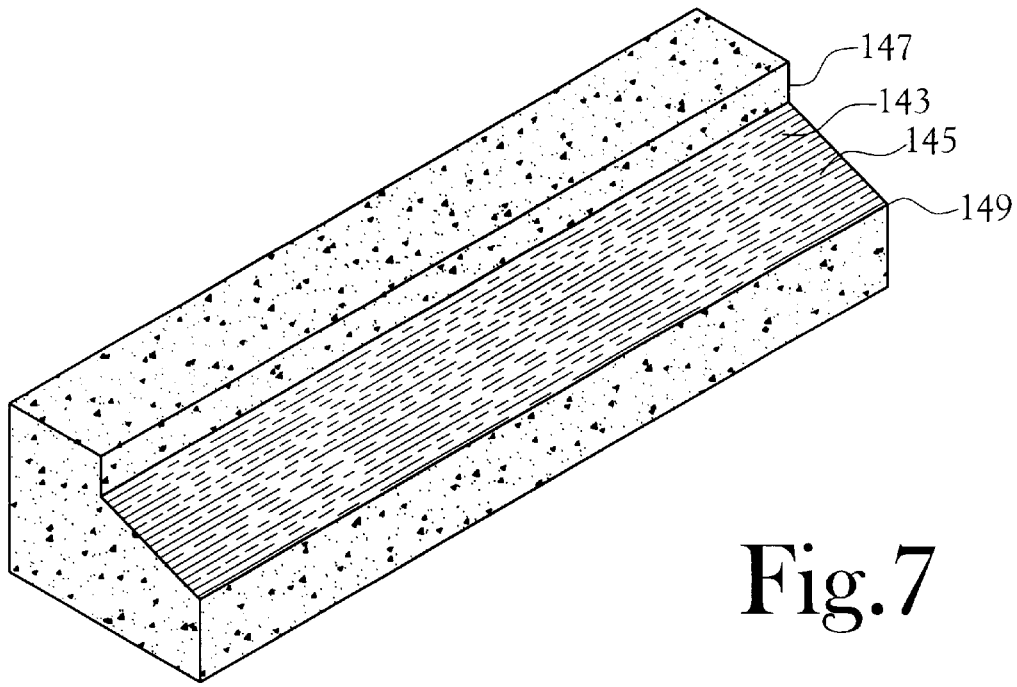
FIG. 7 is a representation of a further know-out groove having a sloping bottom and which has been initially cut employing the blade assembly depicted in FIG. 5.

In FIG. 7, there is depicted a block-out 143 having a bottom 145 which slopes from the inner wall 147 of the block-out in a direction toward the open side 149 of the block-out, thereby providing for drainage from the block-out of any liquid which might tend to otherwise accumulate in the block-out. This cross-sectional geometry of the depicted block-out is achieved with the present saw and employing a blade assembly 157 (See FIG. 5) in which the most distal blade 153 of the assembly is of a selected minimum diameter and the remaining blades are of incrementally decreasing diameter in the inboard direction of the blade assembly.

Given the depicted embodiments of the blade assembly of the present invention, one skilled in the art will recognize other blade configurations which will yield a block-out or trough of any of a variety of geometrical cross-sections, thereby allowing the present saw to make a large variety of cuts by merely altering the relative diameters and positions of the blades of the blade assembly.

Figure 11:
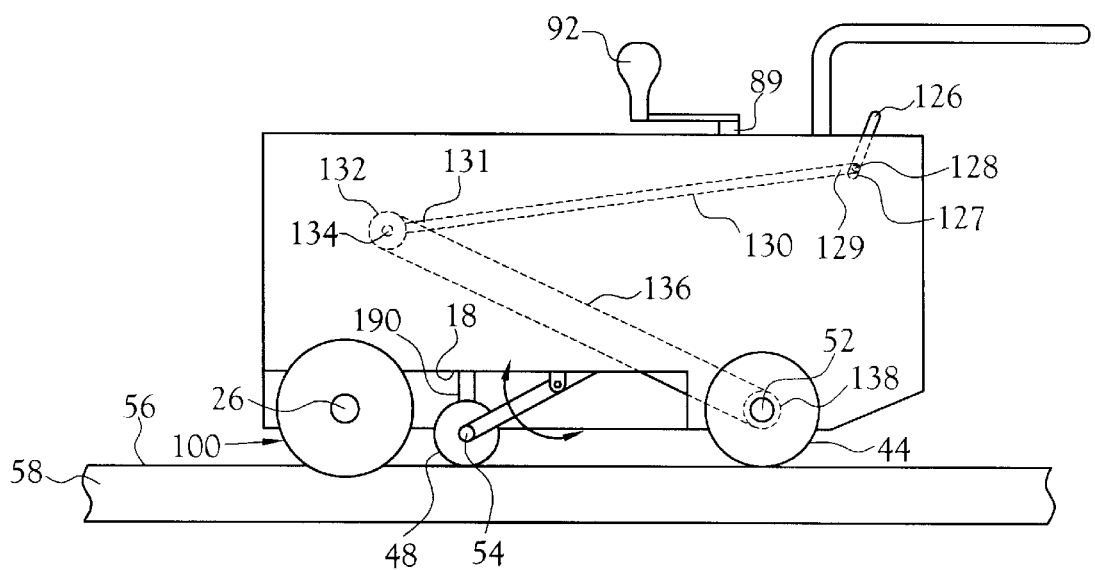
FIG. 11 is a schematic side view of the present invention and depicting, partly in phantom, one embodiment of a drive train for rendering the saw self-propelled.

With reference to FIG. 11, in one embodiment, the present saw may be self-propelled as by means of a pulley 132 mounted on the motor shaft 134 which, in turn is drivingly connected to a pulley 138 affixed to the axle 52 of the first set of wheels 44,46. Actuation of this drive train may be via a clutch or the like (not shown) which is actuatable by means of a lever 126 mounted in the housing adjacent the aft end of the housing, this lever 126 being operably connected to the clutch as means of a connecting rod 130 having one of its ends 129 pivotally connected to the lever 126 and its opposite end 131 operably associated with the clutch. Other apparatus for effecting driven relationship between the motor shaft 134 and the axle 52 will be recognized by one skilled in the art.

With reference to FIGS. 2,8 and 9, it is noted that the axle 54 includes a rigid stop 190 which is fixedly secured to the axle 54 and projects therefrom toward the bottom surface 18 of the bottom of the housing. It will be recognized that when the axle 54 and its set of wheels 48,50 are rotated about its mounting axle 69 by the action of the operator transmitted through the lead screw 90, lead nut 88 and the arms 76,78, the axle 54 and its wheels 48,50 move either toward or away from the bottom surface of the housing bottom. Movement of the axle 54 toward the bottom surface of the housing bottom is halted when the outboard end 192 of the stop engages the bottom surface 18 of the bottom of the housing.

Notably, rotation of the axle 54 in a direction toward the bottom surface of the bottom of the housing moves the stop 190 toward engagement with the bottom surface of the bottom of the housing. This action effects transfer of at least a portion, and preferably a major portion, of the overall weight of the saw from the set of wheels to the cutting blades and biases the cutting blades toward cutting engagement with the top surface of the concrete slab. As the blades cut into the concrete, the overall weight of the saw shifts back to the set of wheels 48,50 (at all times, the set of wheels 48,50 assume a portion of the overall weight of the saw) so that the cutting depth of the blades reaches a depth at which there is a type of equilibrium between the ongoing transfer of a portion of the overall weight of the saw between the cutting blades and the set of wheels 48,50. That is, as the saw is moved forward, the blades engage the uncut end of the kerf and their rotation against the uncut concrete tends to lift the blades out of their respective kerfs. This action tends to raise at least a portion of the overall weight of the saw off the set of wheels 48,50, thereby transferring such portion of the overall weight of the saw to the blades and biasing them toward cutting engagement with the concrete slab. It will be visualized that this transfer of at least a portion of the overall weight of the saw between the wheels 48,50 and the blades continues substantially over the length of a kerf. This action of weight transfer has been found to enhance the cutting life of the blades while simultaneously maximizing the rate of cutting of the kerfs. No deleterious effect has been noted on the desired stability of the saw relative to the top surface of the concrete slab by this weight transfer action. Rather, it has been noted that steering of the saw is enhanced by reason of the automatic adjustment of that portion of the overall weight of the saw which is experienced by the aft wheels 44,46. In this embodiment of the present invention, the absolute maximum cutting depth of the blades is limited by the stop 190 when it engages the bottom surface of the bottom of the housing and shifts all of the weight of the saw away from the blades, thereby, among other things, protecting the blades from inadvertently cutting to a depth where the spacers between the blades engage the uncut portions of concrete between adjacent kerfs and are damaged thereby. Moreover, this self-adjustment of the cutting depth of the blades has been found to produce uniformly deep kerfs, hence a relatively uniform depth over the bottom area of a block-out. Further, inasmuch as the overall weight of the saw is a constant value, the aforedescribed transfer of a portion of this overall weight provides for application of a relatively constant biasing force against the blades in a direction toward their cutting engagement with the concrete slab, as opposed to hand-held saws or mobile saws wherein the operator applies the force which biases a cutting blade into cutting engagement with the concrete slab.

Referring specifically to FIG. 10, in accordance with one aspect of the present invention there is provided a method for the preparation of adjacent side edges of adjacent concrete slabs and the installation of an expansion joint between the prepared adjacent sides of the slabs. This method of the present invention comprises the steps of simultaneously cutting a first plurality of parallel spaced-apart kerfs 120,126 along and parallel with a side edge 132 of a first concrete slab 136, simultaneously cutting a second plurality of parallel spaced-apart kerfs along an adjacent side edge 134 of an adjacent second concrete slab 138, thereafter breaking away uncut portions 140 of the concrete intermediate each of the kerfs of the first and second plurality of kerfs to develop first and second block-outs 130,131, introducing into the space 152 between the adjacent side edges of the adjacent slabs the body portion 154 of a "T"-shaped polymeric expansion strip 156 with the side wings 158,160 of the expansion strip disposed within respective ones of the first and second block-outs, and substantially filling any portion of each block-out not occupied by a side wing of the expansion strip with further polymeric material 162 suitable to bond the side wings within their respective block-outs.

In accordance with another aspect of the present invention there is provided a method for the formation of an elongated block-out or trough in the top surface of a cured concrete slab comprising the steps of simultaneously engaging a plurality of rotating circular concrete cutting blades of a blade assembly with the top surface of the concrete slab, biasing the blade assembly toward cutting engagement with the concrete slab to a selected depth of cut while continuing rotation of the blades of the assembly for a time sufficient to cut a plurality of substantially parallel kerfs in the slab, and thereafter breaking away uncut concrete disposed between adjacent ones of the kerfs. This method may further include the step of selecting the relative diameters and positional relationships of the plurality of blades of the blade assembly to obtain a desired cross-sectional geometry of the resulting block-out or trough.

In accordance with one aspect of the present invention, the inventors further provide a method for controlling the cutting depth of the cutting blades of the mobile saw for simultaneously cutting a plurality of substantially parallel kerfs in the top surface of the cured concrete slab comprising the steps of mounting the saw on at least aft and formal means adapted to support the saw for movement along the top surface of the concrete slab, adjusting the spatial relationship of the forward means adapted to support the saw and the top surface of the concrete slab, thereby transferring at least a portion of the overall weight of the saw to the plurality of cutting blades for a time sufficient to cut a plurality of kerfs in the concrete slab to a predetermined cutting depth, and thereafter transferring the at least a portion of the overall weight of the saw from the cutting blades to the first means adapted to support the saw.

In one embodiment of the transfer of the at least a portion of the overall weight of the saw from the cutting blades to the first means adapted to support the saw is substantially continuously repeated over the length of the kerfs.

In a preferred embodiment, all of the blades are rotating at the same rotational speed. Moreover, preferably, the direction of rotation of the blades of the present blade assembly develops "down-cutting" of the concrete by each blade with the debris from the kerfs being discharged toward the aft end of the saw. Down-cutting of the blades aids in controlling the forward movement of the saw in that the operator is not "fighting" any tendency of the rotating blade to cut into the uncut concrete and adversely affect the desired smooth and continuous forward movement of the saw and resultant uniform depth of all the kerfs. If desired, this direction of rotation of the blades may be reversed to effect "up-cutting" by the blades, but with the need to shield against debris from the kerfs being discharged into the saw or the forward path of the saw and to accommodate any tendency of the saw to move itself erratically forward.

In one embodiment of the present invention, debris discharged from the kerfs by the down-cutting blades of the saw is deflected outwardly from the saw by means of a deflector 172 shield which is mounted to the blade housing at the aft end thereof and which is contoured to ensure the desired deflection of the debris.

Whereas specific embodiments of the various features of the present invention have been depicted and described herein, one shield in the art will recognize equivalent embodiments and is in intended that the invention be limited only as set forth in the claims appended hereto.

What is claimed:

1. A mobile saw for simultaneously cutting a plurality of substantially parallel kerfs in a concrete slab having a top surface, comprising a housing having first and second side portions, aft and forward ends, and a bottom portion, a motor supported by said housing, means for supporting said housing for transport over the top surface of a concrete slab, said means including a first support assembly disposed adjacent said aft end of the housing and a second support assembly disposed forward of said first support assembly and whose spatial relationship to said housing is adjustable, at least one shaft having first and second opposite ends and a longitudinal rotational axis, said shaft being secured to said bottom portion of said housing, extending transversely of said housing between the opposite sides thereof, and with at least one of its ends projecting outwardly in cantilevered fashion from at least one of said first and second side portions of said housing, said shaft being disposed substantially parallel with the top surface of the concrete slab, means connecting said motor in driving relationship to said at least one shaft for rotation of said at least one shaft about its longitudinal axis, a plurality of circular concrete-cutting blades secured to that end of said shaft which projects outwardly from said at least one side of said housing and rotatable with said at least one shaft, said blades being disposed in spaced apart side-by-side relationship to, and substantially parallel to one another in respective planes which are substantially normal to said longitudinal rotational axis of said shaft, means for selectively adjusting the spatial relationship of said at least one support member relative to said housing and thereby selectively adjusting the spatial relationship of said at least one shaft and said plurality of blades relative to the top surface of the concrete slab.

2. The saw of claim 1 wherein said plurality of cutting blades of said blade assembly are biased toward cutting relationship with the concrete slab.

3. The saw of claim 2 wherein said plurality of cutting blades of said blade assembly are biased by means of at least a portion of the overall weight of the saw.

4. The saw of claim 1 and including means transferring said at least a portion of the overall weight of the saw from said blades of said blade assembly to said means for selectively adjusting the spatial relationship of said at least one support member relative to said housing.

5. The saw of claim 1 wherein said motor has an effective horsepower of between at least one and not greater than 25 horsepower.

6. The saw of claim 1 wherein the saw is self-propelled.

7. The saw of claim 1 wherein said blade assembly includes between 2 and 10 blades.

8. The saw of claim 1 wherein each of said blades of said blade assembly is spaced apart from its most adjacent blade by a distance of between about three-eighths and about one-half inch.

9. The saw of claim 1 wherein each of said blades is capable of cutting a kerf of up to about three-eighths inch in width.

10. The saw of claim 1 wherein each of all of the blades of said plurality of blades is of substantially the same cutting diameter.

11. The saw of claim 1 wherein the cutting diameter of said blades decreases incrementally from a first blade at one side of the blade assembly to the last blade at the opposite side of the blade assembly.

12. The saw of claim 1 wherein the cutting diameter of the outboard ones of said blades of said blade assembly are of a first cutting diameter and the remaining blades of the blade assembly increase incrementally to a central blade of a second cutting diameter.

13. The saw of claim 1 wherein all of the blades of said blade assembly are rotated to cut-down into the concrete.

14. The saw of claim 1 wherein the saw is of an overall weight and size amenable to ready movement thereof through a building employing a motive force applied to said means for transporting said saw along the top surface of a concrete slab located within the building.

15. A method for the preparation of adjacent side edges of first and second adjacent slabs of cured concrete for the installation of an expansion joint therebetween comprising the steps of simultaneously cutting a first plurality of parallel space-apart kerfs along and parallel with a side edge of the first slab, simultaneously cutting a second plurality of parallel spaced-apart kerfs along and parallel with a side edge of the second slab, and breaking away uncut portions of the concrete between adjacent ones of said kerfs of said first and second pluralities of kerfs to develop a block-out extending along and generally parallel with the side edge of each of the first and second slabs.

16. The method of claim 15 wherein each of said first and second plurality of kerfs includes at least two and not more than ten kerfs.

17. The method of claim 15 wherein each of said first and second plurality of kerfs are of substantially the same cut depth.

18. The method of claim 15 wherein the blades of said plurality of blades are of substantially the same cutting diameter.

19. The method of claim 15 wherein the cutting diameter of said blades decreases incrementally from a first blade at one side of the blade assembly having a first diameter to the last blade at the opposite side of the blade assembly having a second diameter.

20. The method of claim 15 wherein the cutting diameter of the outboard ones of said blades of said blade assembly are of a first cutting diameter and the remaining blades of the blade assembly increase incrementally to a central blade of a second cutting diameter.

21. A method for the formation of an elongated block-out or trough in the top surface of a cured concrete slab comprising the steps of simultaneously engaging a plurality of rotating circular concrete cutting blades of a blade assembly with the top surface of the concrete slab, biasing the blade assembly toward cutting engagement with the concrete slab to a selected depth of cut while continuing rotation of the blades of the assembly for a time sufficient to cut a plurality of substantially parallel kerfs in the slab, and thereafter breaking away uncut concrete disposed between the kerfs.

22. The method of claim 21 wherein the blades of said plurality of blades are of substantially the same cutting diameter.

23. The method of claim 21 wherein the cutting diameter of said blades decreases incrementally from a first blade at one side of the blade assembly having a first diameter to the last blade at the opposite side of the blade assembly having a second diameter.

24. A method for controlling the cutting depth of the cutting blades of a mobile saw having aft and forward ends, for use in the simultaneous cutting of a plurality of substantially parallel kerfs in the top surface of a cured concrete slab comprising the steps of mounting said saw on at least first and second means adapted to support said saw for movement along said top surface of said concrete slab, said first means being disposed adjacent the aft end of the saw and said second means being disposed intermediate said first means and the forward end of the saw, adjusting the spatial relationship of said second means said saw and said top surface of said concrete slab, transferring at least a portion of the overall weight of said saw to said plurality of cutting blades for a time sufficient to cut a plurality of kerfs in said concrete slab to a predetermined cutting depth, and thereafter transferring said at least a portion of the overall weight of said saw from said cutting blades to said second means adapted to support said saw.

25. The method of claim 24 wherein said transfer of said at least a portion of the overall weight of said saw from said cutting blades to said second means adapted to support said saw is substantially continuously repeated over the length of said kerfs.

* * * * *